Figure 1:
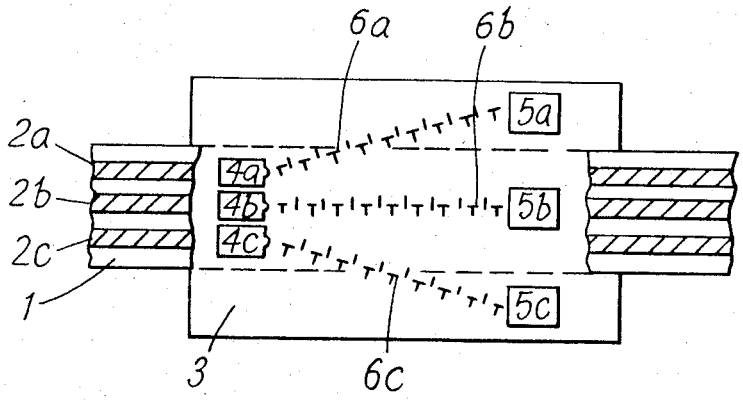
Figure 2:
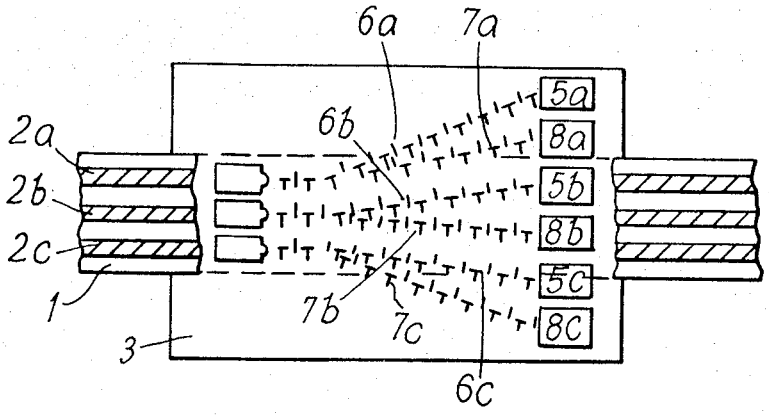

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 6, 1974

925 O.G. 10

T925,007
BUBBLE MAGNETICS

Anthony Graham Marshall Last, Welwyn Garden City, England, assignor to Imperial Chemical Industries Limited, London, England

Filed Nov. 12, 1973, Ser. No. 415,125
Claims priority, application Great Britain, Nov. 23, 1972, 54,196/72
Int. Cl. G11b *5/30*
U.S. Cl. 360—115
1 Sheet Drawing. 12 Pages Specification

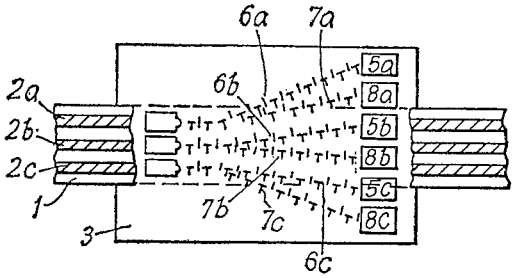

A tape reading head consists of guide paths of discrete particles of low coercivity magnetic material on an ortho ferrite layer connecting bubble generators to collectors. The tracks may diverge to allow adequate space for the collectors for closely packed guide paths. The information on the tape is read by arranging that the intensity of the magnetic field of the bits of information on the tape is sufficient to cause a fresh bubble to be detached from a generator and/or a rotating magnetic field is applied so that each bit of stored information causes a bubble to be diverted from one track to another.

BUBBLE MAGNETICS

Filed Nov. 12, 1973